Figure 1:
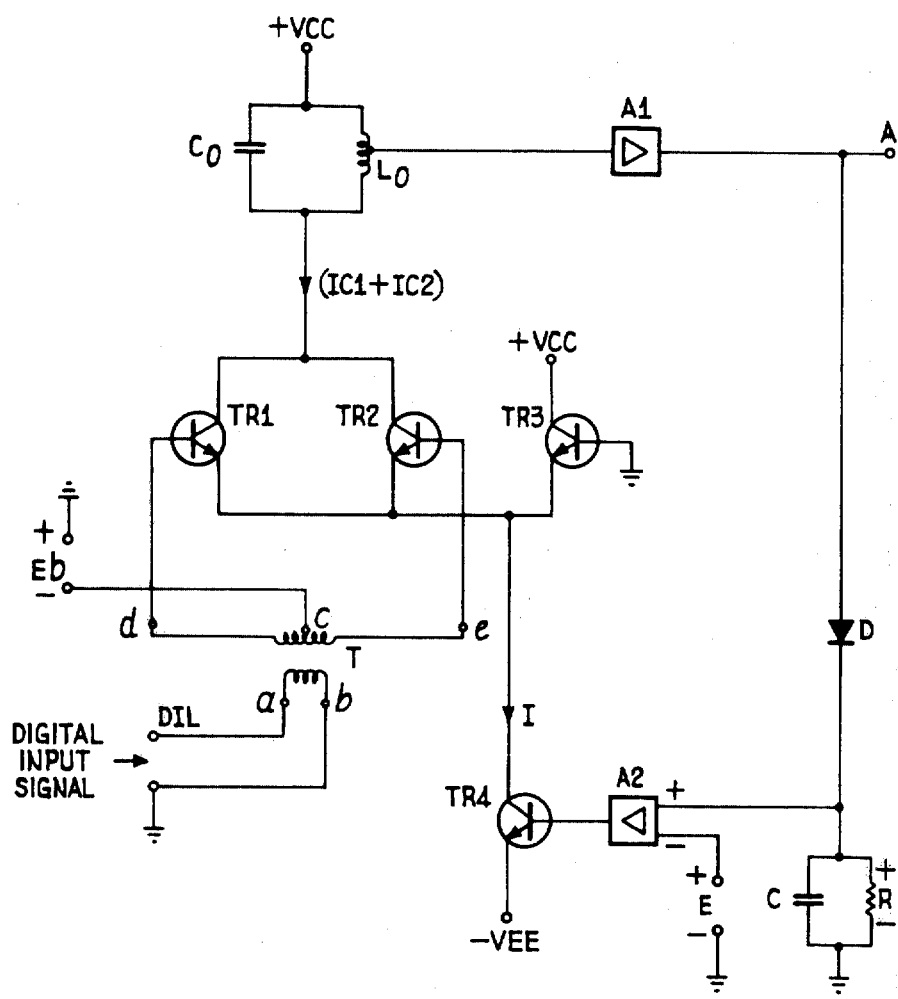

United States Patent [19]

Larner

[11] 4,027,178
[45] May 31, 1977

[54] CIRCUIT FOR GENERATING SYNCHRONIZATION SIGNALS

[75] Inventor: Douglas Stanley Larner, Maidenhead, England

[73] Assignee: Plessey Handel und Investments A.G., Switzerland

[22] Filed: Dec. 10, 1975

[21] Appl. No.: 639,482

[30] Foreign Application Priority Data

Dec. 18, 1974 United Kingdom ............ 54816/74

[52] U.S. Cl. ................................. 307/269; 328/63; 328/139; 178/69.1
[51] Int. Cl.[2] ..................... H03K 1/17; H03K 5/13; H03B 1/00
[58] Field of Search ............... 307/269; 328/63, 32, 328/28, 139, 138; 178/69.5 R

[56] References Cited

UNITED STATES PATENTS

| 3,007,143 | 10/1961 | Hagopian | 328/63 |
| 3,249,763 | 5/1966 | Hopner | 307/269 |
| 3,609,408 | 9/1971 | Motisher et al. | 307/269 |
| 3,707,683 | 12/1972 | Dotter, Jr. | 328/139 |

Primary Examiner—Stanley D. Miller, Jr.
Attorney, Agent, or Firm—Fleit & Jacobson

[57] ABSTRACT

A circuit for generating synchronization signals from a digital data pulse train having a bit period T and conveying pulses in non-return-to-zero form. The circuit comprising (i) a rectifier device arranged to fullwave rectify the digital data pulse train, (ii) an oscillatory circuit tuned to oscillate with period T and stimulated by the transitions of a waveform produced by the fullwave rectifier device and (iii) a peak detector arranged to produce a bias signal which is proportional to the amplitude of the output of the oscillatory circuit. The bias signal being active upon the fullwave rectifier device to stabilize the amplitude of the waveform produced by the oscillatory circuit.

4 Claims, 3 Drawing Figures

CIRCUIT FOR GENERATING SYNCHRONIZATION SIGNALS

The present invention relates to a circuit for generating synchronization signals from a digital data pulse train using non-return-to-zero digital transmission.

In one method in the prior art of generating synchronization pulses from the received pulse train, there is provide a fullwave rectifier device driving a parallel L/C tuned circuit, operating an a ringing circuit, which in turn feeds as impulse generator. In such an arrangement the rate of stimulation of the tuned circuit is directly related to the variations in the rate of occurrence of transitions in the rectified digital waveform. Because of this, large variations in the amplitude of the sinewave developed across the resonant circuit can occur.

To illustrate this, consider the case where the digital signal sent to line is a continuous succession of pulses alternately positive and negative. These will produce pulses with two transitions, one rising and one falling for every pulse occurring. Stimulation of the tuned circuit will then be at a maximum and a large amplitude sinewave will be developed across it in the steady state.

If the transmitted signal is changed to alternating blocks of four pulses of opposite polarity, the rectified and shaped waveform will approximate towards a square wave. Here the number of transitions per unit of time is only one eighth of that previously and in the steady state the sinewave amplitude developed could be correspondingly reduced by approximately eight times. In the prior art such amplitude variations are minimized by using an amplitude limiting device interposed between the output of the tuned circuit and the impulse generator. The use of such limiting devices however introduces amplitude-to-phase conversion and consequently additional jitter as far as the recovered synchronization pulse train is concerned.

Accordingly it is an object of the present invention to provide an improved circuit for generating synchronization signals from a data pulse train which does not involve the use of an amplitude limiting device.

According to the invention there is provided a circuit for generating synchronization signals from a digital data pulse train handling non-return-to-zero bits having a bit period of T, the circuit comprising (i) a rectifier device adapted to fullwave rectify the digital data pulse train, (ii) an oscillatory circuit tuned to oscillate with period T and stimulated by the transitions of a waveform produced by the fullwave rectifier device and (iii) a peak detector adapted to produce a bias signal which is proportional to the amplitude of the output of the oscillatory circuit, the bias signal being active upon the fullwave rectifier device to stabilize the amplitude of the waveform produced by the oscillatory circuit.

Preferably the fullwave rectifier device is arranged to operate as an algebraic square-law device incorporating self-regulating arrangements responsive to the bias signal.

According to an embodiment of the invention the fullwave rectifier circuit includes a differential amplifier employing emitter coupled transistors fed from a constant current source and the bias signal is arranged to control the current produced by the constant current source.

Figure 2A:
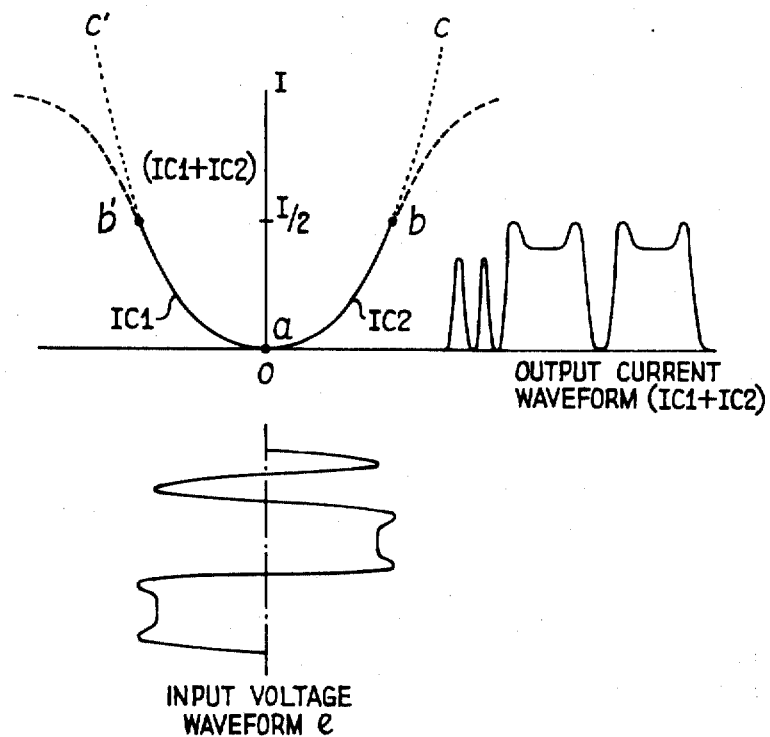
Figure 2B:
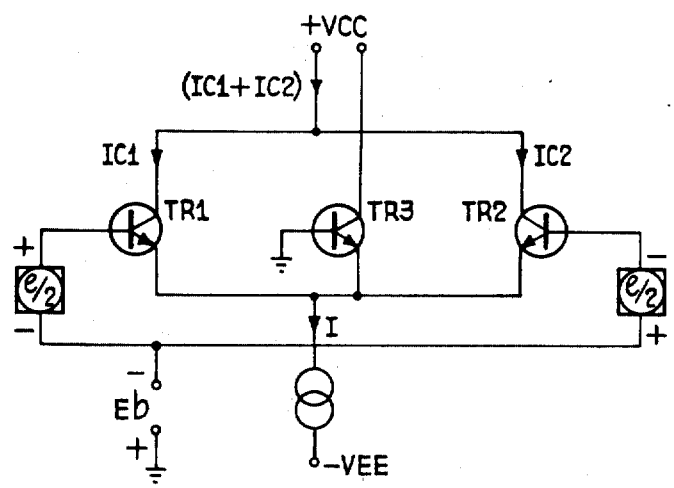

The invention will be understood from the following description of one embodiment thereof which should be read in conjunction with the accompanying drawings. Of the drawings:

FIG. 1 shows a circuit diagram of a circuit for generating synchronization pulses according to the invention and FIGS. 2a and 2b show waveforms which will be used in the description of the invention and a simplified diagram of the fullwave rectifier section of FIG. 1.

The circuit of FIG. 1 comprises (i) a self regulating fullwave rectifier (transistors TR1, TR2, TR3 and TR4), (ii) an L.C. tank circuit (capacitor Co and inductor Lo) and (iii) a level detector (diode D, capacitor C and resistor R in association with differential amplifier A2).

The self-regulating fullwave rectifier circuit comprises an emitter coupled triplet using transistors TR1, TR2 and TR3 with the common emitter or so-called "tail" current instantaneously constant but controlled by transistor TR4. Transistors TR1 and TR2 are back-biased to cut-off in the quiescent condition. The necessary bias, Eb, is applied to TR1 and TR2 bases by the center-tap, c, of the input transformer T which also provides a differential input signal at $d$ and $e$.

The input transformer T is fed with the self-clocked data train from which the synchronization pulses are to be derived. Typically the waveform shown in FIG. 2a corresponds to that experienced when the digital data train uses ternary signals according to the non-return-to-zero format. The fullwave rectifier circuit shown simplified in FIG. 2b exhibits an approximate parabolic response curve as shown in FIG. 2a involving the two segments $ab$ and $ab'$. The approximation fails for higher currents as indicated in FIG. 2a by the curve $c'$-$a$-$c$, however, if the rectifier circuit is current biased and the peak signal amplitude is arranged not to exceed Eb the rectifier circuit will function with an algebraic square-law characteristic.

In the quiescent state of the rectifier circuit all the emitter current I flows in transistor TR3. The actual level of this current is controlled by the biasing of transistor TR4 shown in FIG. 1. This feature will be considered in detail later. The reception of input information on lead DIL causes either transistor TR1 or TR2 to start to conduct in accordance with the "sign" of the input waveform. FIG. 2b depicts the inputs as separate generators $e/2$ and FIG. 2a, shows how a received ternary digital data train would be rectified by the circuit of FIG. 2b with the "tail" current I remaining constant.

The output current of the rectifier circuit is used to excite a resonant circuit as shown in FIG. 1. The resonant tank circuit uses capacitor CO and inductor LO and is tuned to the synchronization timing wave frequency. However a timing-wave recovered from the resonant circuit in an arrangement involving transistor TR4 always passing a constant current will show large variations in amplitude due to the variation in stimulation repetition rate. These are due to changes in the time-density of transitions between levels in the equalized digital signal.

The amplitude-control circuit used to minimise the above variations employs the technique of changing the tail current I by controlling the conduction of transistor TR4.

If the tail current I of the rectifier is changed, there is no change in the shape of the emitter-coupled transfer characteristic, only in its magnitude. Thus it is possible to modulate the magnitude of the output current waveform without affecting the shaping characteristic.

The shaped current waveform excites the tank circuit LO, CO from which a recovered sinewave is tapped off and amplified by A1. The recovered sinewave at the output of the amplifier A1 is peak detected by diode D, capacitor C and resistor R to produce a voltage proportional to its amplitude. This is compared with a reference voltage, E, by the differential amplifier A2. The output of amplifier A2 is used, by way of transistor TR4, to modulate the current I of the emitter-coupled triple in such a way as to minimise variations in amplitude of the recovered sinewave, but without affecting the shaping process.

With this circuit, amplitude limiting of the recovered timing wave is avoided. Such limiting is a common cause of amplitude-to-phase conversion resulting in timing jitter. Instead of this, the input to the resonant tank circuit is controlled by a linear process.

The above amplitude control circuit is a closed-loop system whose stability must be assured by the usual considerations of gain/phase relationships and the filtering time constants of the peak detector. In addition the tank circuit itself responds with a time-constant equal to $\frac{Q}{\pi fd}$ where:

$Q$ = resonant circuit quality factor and $fd$ = pulse repetition frequency of the digital signal.

The circuit has good inherent temperature stability since it can be shown that the magnitude of any abcissa on the transfer characteristic corresponding to a given collector current is proportional to absolute temperature, i.e. has a temperature coefficient of about 0.3% per ° C at room temperature. Should the degree of stability be inadequate, second-order temperature compensation is possible if $Eb$ is made suitable temperature-dependent.

What we claim is:

1. A circuit for generating synchronization signals from a digital data pulse train handling non-return-to-zero bits having a bit period of T, the circuit comprising in combination,
   a fullwave rectifier means for receiving a digital data pulse train and producing a rectified output waveform corresponding to the digital data pulse train transitions and including a bias signal responsive means for controlling the amplitude of said rectified output waveform,
   an oscillatory circuit tuned to oscillate with period T, fed by said rectifier output waveform and stimulated by the transitions of said rectified output waveform to produce said synchronization signals and a bias level generator means for generating a bias signal proportional to the amplitude of said synchronization signals, and for applying the same to said bias signal responsive means.

2. A circuit for generating synchronization signals according to claim 1 wherein said fullwave rectifier means includes a differential amplifier employing emitter coupled transisitors fed from a current source including said bias signal responsive means.

3. A circuit for generating synchronization signals according to claim 1 wherein said bias level generator means comprises a peak detector means for producing a voltage proportional to the amplitude of said synchronization signals and a differential amplifier means for comparing said voltage to a reference voltage.

4. A circuit for generating synchronization signals according to claim 2, wherein said bias signal responsive means comprises a transistor having its collector electrode connected to said emitter coupled transistors, its emitter connected to a voltage source, and its base connected to the bias level generator means to receive the bias signal.

* * * * *